(12) United States Patent
Miller

(10) Patent No.: US 6,755,633 B2
(45) Date of Patent: Jun. 29, 2004

US006755633B2

(54) PROCESS FOR MANUFACTURING RESIN-BASED COMPOSITE MATERIAL

(75) Inventor: Lester D. Miller, Ligonier, IN (US)

(73) Assignee: Owens Corning Fiberglas Technology, Inc., Summit, NJ (US)

( * ) Notice: Subject to any disclaimer, the term of this patent is extended or adjusted under 35 U.S.C. 154(b) by 195 days.

(21) Appl. No.: 09/998,731

(22) Filed: Nov. 30, 2001

(65) Prior Publication Data

US 2003/0102596 A1 Jun. 5, 2003

(51) Int. Cl.[7] ............................................. B29C 39/06
(52) U.S. Cl. ........................... 425/64; 425/96; 425/99; 425/103; 425/107; 425/73; 425/173; 425/213; 198/465.2; 198/465.3
(58) Field of Search ........................... 198/465.2, 465.3; 425/453, 96, 99, 103, 90, 64, 107, 73, 173, 213, 440

(56) References Cited

U.S. PATENT DOCUMENTS

| | | | | |
|---|---|---|---|---|
| 1,531,296 A | * | 3/1925 | Loomis et al. ............... | 425/443 |
| 2,664,592 A | * | 1/1954 | Ingraham .................... | 425/447 |
| RE24,804 E | | 3/1960 | Shorts ......................... | 156/85 |
| 2,927,623 A | | 3/1960 | Huisman et al. ............ | 156/179 |
| 3,077,000 A | | 2/1963 | Huisman et al. ............ | 425/183 |
| 3,189,971 A | * | 6/1965 | Derror ........................ | 425/453 |
| 3,942,926 A | * | 3/1976 | Bulloch, Jr. ............... | 425/126.1 |
| 3,957,410 A | * | 5/1976 | Marshall et al. ............ | 425/183 |
| 4,082,882 A | | 4/1978 | Weinstein et al. .......... | 442/286 |
| 4,687,428 A | * | 8/1987 | Martin et al. ............... | 425/60 |
| 4,963,408 A | | 10/1990 | Huegli ....................... | 428/71 |
| 5,135,793 A | | 8/1992 | Socha ........................ | 428/74 |
| 5,498,460 A | | 3/1996 | Tingley ...................... | 428/96 |
| 6,503,073 B2 | * | 1/2003 | Dewanjee et al. .......... | 425/116 |
| 2003/0143373 A1 | * | 7/2003 | Bledsoe et al. ............. | 428/138 |

OTHER PUBLICATIONS

Rivers, Ron—"Venus–Gusmer Ships Turnkey Facility for Reinforced Plastic Trailer Panels"—Elkhart Truth, Jan. 24, 1995.

Miller, Jim—"Fabwel Always on the Lookout for Acquisitions"—The Truth Business Report, Jan. 24, 1995.

* cited by examiner

Primary Examiner—Robert Davis
Assistant Examiner—Joseph S Del Sole
(74) Attorney, Agent, or Firm—Inger H. Eckert; James J. Dottavio

(57) ABSTRACT

A process and apparatus for manufacturing fiberglass-reinforced panels are provided. The apparatus includes a guide mechanism and drive mechanism to drive individual elongate molds through a gel coating spraying section and thereafter through an oven to cure the gel coat. The elongate molds are thereafter driven through first and second resin/fiberglass application stations to apply a composite of resin and fiberglass strands. The apparatus also includes a station whereby wooden boards may be placed over the top of the resin and the fiberglass strands, and thereafter to a vacuum station whereby a vacuum can be placed over the wooden boards, such that when a vacuum is drawn on the composite, the resin is drawn into the wooden boards to form an integrated deposit panel.

37 Claims, 17 Drawing Sheets

PROCESS FOR MANUFACTURING RESIN-BASED COMPOSITE MATERIAL

TECHNICAL FIELD

The subject application relates to a method and apparatus for the manufacture of resin based, fiber-reinforced panels.

BACKGROUND OF THE INVENTION

It is commonplace in the recreational vehicle business to use glass fiber-reinforced wall panels for the exterior surface of the recreational vehicle. These wall panels vary in widths up to, and including, dimensions from 2.4 to 3 meters (8 to 10 feet), and can have a length as long as 12 meters (40 ft.) or more. While the composite material from which the panels are made provides an adequate material for the recreational vehicle side walls, the presently utilized processes and equipment for manufacturing the composite material invariably may emit VOCs, both within the facility, as well as that which may be exhausted to atmosphere.

The process of making the composite material first begins with use of an elongate mold. The mold is somewhat larger than the panels to be made, but large enough to accommodate the 3×12 meter (10×40 ft.) panels. The upper surface is a finished surface to provide a substantially flat and smooth surface, as it is this surface that forms the visible exterior surface of the panels to be made.

The prepared mold is first sprayed with a coating known as a gel coating, which cures to form a high gloss exterior surface for the panel. Once cured, a resin and fiberglass are applied to the top surface of the gel coating, and then a plurality of panels, typically hard board (such as luan panels) are positioned side by side on top of the fiberglass. The seams between the panels are covered with a seam material, and a vacuum bag is then placed over the top of the panels and a slight vacuum is introduced which draws resin into the luan panels to form a finished product. The completed product is then pulled off of the mold and cut and trimmed to the proper size.

One method of applying the gel coating is to maintain the elongate mold in a stationary fashion, and move the gel coating sprayer longitudinally along rails and spray the entire length of the elongate mold. While this provides for an excellent layer of gel coating on the mold, due to the movement of the sprayer, capturing the fumes of the gel coating can be difficult. Furthermore, as maintenance of the molds is required, the molds are moved into and out of their various positions by way of an overhead crane, which due to the size of the elongate mold, can be a difficult operation. The objects of the invention are therefore to overcome the shortcomings of the prior art.

SUMMARY OF THE INVENTION

The objects of the invention have been accomplished by providing an apparatus for manufacturing fiberglass-reinforced panels, comprising a plurality of molds for receiving the components of the panels, a spraying apparatus for applying an exterior coat for the panels, an applicator mechanism for applying the fiberglass to the panels, a guide mechanism for guiding the molds through the spraying apparatus and applicator mechanism, and a drive mechanism for independently driving individuals ones of the plurality of molds.

In a preferred embodiment of the invention, the drive mechanism is comprised of a plurality of drive rollers. The molds each comprise an elongate support surface, having an upper finished surface, and a lower sub-frame, the lower sub-frame including a horizontally projecting, longitudinally extending drive surface, whereby the drive rollers engage the drive surface. The sub-frame includes at least one longitudinally extending I-beam, and the lower drive surface is provided by a lower surface thereof. The drive rollers are preferably driven by variable speed motors which are individually controllable.

The guide mechanism is comprised of a plurality of guide rollers. The guide rollers comprise a first plurality of rollers, each having a rotational axis along a horizontal axis, to guide the molds in a horizontal sense. The molds each comprise an elongate support surface having an upper finished surface, and a lower sub-frame, where the sub-frame includes horizontally projecting, longitudinally extending first reference surfaces, whereby the first plurality of rollers engage the first reference surfaces. The guide rollers further comprise a second plurality of rollers, each having a rotational axis along a vertical axis, to guide the molds in a lateral sense. The molds further comprise vertically projecting, longitudinally extending second reference surfaces, whereby the second plurality of rollers engage the second reference surfaces. The molds each comprise an elongate support surface, having an upper finished surface, and a lower sub-frame comprises I-beam members extending longitudinally below the elongate support surface and adjacent to lateral side edges thereof, the first reference surfaces are defined by lower sections of the I-beam members, and the second reference surfaces are defined by exterior channels formed by the I-beams. The lower sub-frame further includes a longitudinally extending central I-beam, and a lower surface of the central I-beam provides a drive surface. The drive mechanism is comprised of drive rollers positioned beneath the central I-beam, drivingly engaging the drive surface.

Preferably, the spraying apparatus flanks the guide mechanism, whereby the molds are driven relative to, and through, the spraying apparatus, and has an enclosure surrounding the spraying apparatus. Enclosure further includes a ventilation system to vent fumes within the enclosure. An oven extends longitudinally from the enclosure, whereby the molds, after passing through the spraying apparatus, are driven through the oven.

In another embodiment of the invention, an apparatus for manufacturing fiberglass-reinforced panel, comprises a plurality of molds for receiving the components of the panels, a spraying apparatus for applying an exterior coat for the panels, an applicator mechanism for applying the fiberglass to the panels, a guide mechanism for guiding the molds through the spraying apparatus and applicator mechanism, and an enclosure surrounding the spraying apparatus and applicator mechanism.

In a preferred embodiment of the invention, the enclosure further includes a ventilation system to vent fumes within the enclosure. The enclosure is defined as a curing oven intermediate the spraying apparatus and applicator mechanism. The apparatus further comprises an operator viewing station, for viewing moving molds within the enclosure, from a position exterior of the enclosure. The apparatus also further comprises an operator enclosed area, downstream of the applicator mechanism. The operator enclosed area is preferably down-drafted to improve the air quality within the operator enclosed area.

Preferably, the apparatus further comprises a drive mechanism comprised of a plurality of drive rollers, to propel individual molds through the enclosure. The molds each comprise an elongate support surface, having an upper finished surface, and a lower sub-frame, the lower sub-frame including a horizontally projecting, longitudinally extending drive surface, whereby the drive rollers engage the drive surface. The lower sub-frame includes at least one longitudinally extending I-beam, and the lower drive surface is provided by a lower surface thereof. The drive rollers are driven by variable speed motors which are individually controllable.

In a preferred embodiment of the invention, the guide mechanism is comprised of a plurality of guide rollers. The guide rollers comprise a first plurality of rollers, each having a rotational axis along a horizontal axis, to guide the molds in a horizontal sense. The guide rollers further comprise a second plurality of rollers, each having a rotational axis along a vertical axis, to guide the molds in a lateral sense. The molds each comprise an elongate support surface, having an upper finished surface, and a lower sub-frame comprised of an I-beam structure, comprising I-beam members extending longitudinally below the elongate support surface and adjacent to lateral side edges thereof, whereby the first plurality of rollers are profiled to contact a lower section of the I-beam, and the second plurality of rollers flank the I-beams, with rollers positioned within and engaging, exterior channels formed by the I-beams. The lower sub-frame further includes a longitudinally extending central I-beam, and a lower surface of the central I-beam provides a drive surface. The apparatus further comprises a drive mechanism preferably comprised of drive rollers positioned beneath the central I-beam, drivingly engaging the drive surface.

In yet another aspect of the invention a novel method of manufacturing fiberglass-reinforced panel, comprises the steps of providing a mold having an upper finished surface, moving each the mold individually along a longitudinal path, spraying the moving mold with a coating, at least partially curing the coating, applying a resin and fiberglass to the coating, applying stiffener boards on top of the resin, and applying a vacuum to the molds to complete the reinforced panels.

In a preferred method, the spraying step is done in an enclosed ventilated booth. The coating is cured within a heated and enclosed curing chamber which extends continuously from the enclosed booth. The molds are individually moved by way of a drive roller which engages the mold to drive the mold longitudinally.

In yet another embodiment of the invention, an apparatus for manufacturing fiberglass reinforced panels, comprises a plurality of individual molds for receiving the components of the panels, a first longitudinal process line including a spraying apparatus for applying an exterior coat for the panels, and applicator mechanisms for applying resin and fiberglass strands to the panels. A second longitudinal process line operates parallel to, but in an opposite direction to, the first longitudinal process line. A first transverse transfer station transversely connects an end of the first longitudinal process line with a starting position of the second longitudinal process line.

In a preferred embodiment of this invention, second transverse transfer station transversely connects an end of the second longitudinal process line with a starting position of the first longitudinal process line. The first longitudinal process line includes a guide mechanism for guiding the individual molds through the spraying apparatus and applicator mechanisms. The guide mechanism is comprised of a plurality of guide rollers. The guide rollers comprise a first plurality of rollers, each having a rotational axis along a horizontal axis, to guide the molds in a horizontal sense. The molds each comprise an elongate support surface, having an upper finished surface, and a lower sub-frame, the lower sub-frame including horizontally projecting, longitudinally extending first reference surfaces, whereby the first plurality of rollers engage the first reference surfaces. The guide rollers further comprise a second plurality of rollers, each having a rotational axis along a vertical axis, to guide the molds in a lateral sense. The molds further comprise vertically projecting, longitudinally extending second reference surfaces, whereby the second plurality of rollers engage the second reference surfaces.

Preferably, the first transverse transfer station includes a movable trolley, whereby the trolley has an upper roller assembly, comprised of a third plurality of rollers substantially identical to the first plurality of rollers, and a fourth plurality of rollers, substantially identical to the second plurality of rollers, whereby the trolley may be laterally aligned with the first longitudinal process line, with the first and third plurality or rollers aligned, and the second and fourth plurality of rollers aligned, and the individual molds may be moved from the first longitudinal process line directly to the trolley, and thereafter transferred to the second longitudinal process line. The apparatus further comprises a first drive mechanism to drive the individual molds along the first longitudinal process line. Also preferably, a second drive mechanism is provided to drive the trolley between the first and second longitudinal process lines. The second longitudinal process line includes a fifth and sixth plurality of rollers, substantially identical to the first and second plurality of rollers, whereby the trolley may be laterally aligned with the second longitudinal process line, with the third and fifth plurality or rollers aligned, and the fourth and sixth plurality of rollers aligned, and the individual molds may be moved directly from the trolley to the second longitudinal process line. The apparatus further comprises a third drive mechanism to drive the individual molds along the second longitudinal process line.

DETAILED DESCRIPTION AND PREFERRED EMBODIMENTS OF THE INVENTION

Figure 1:
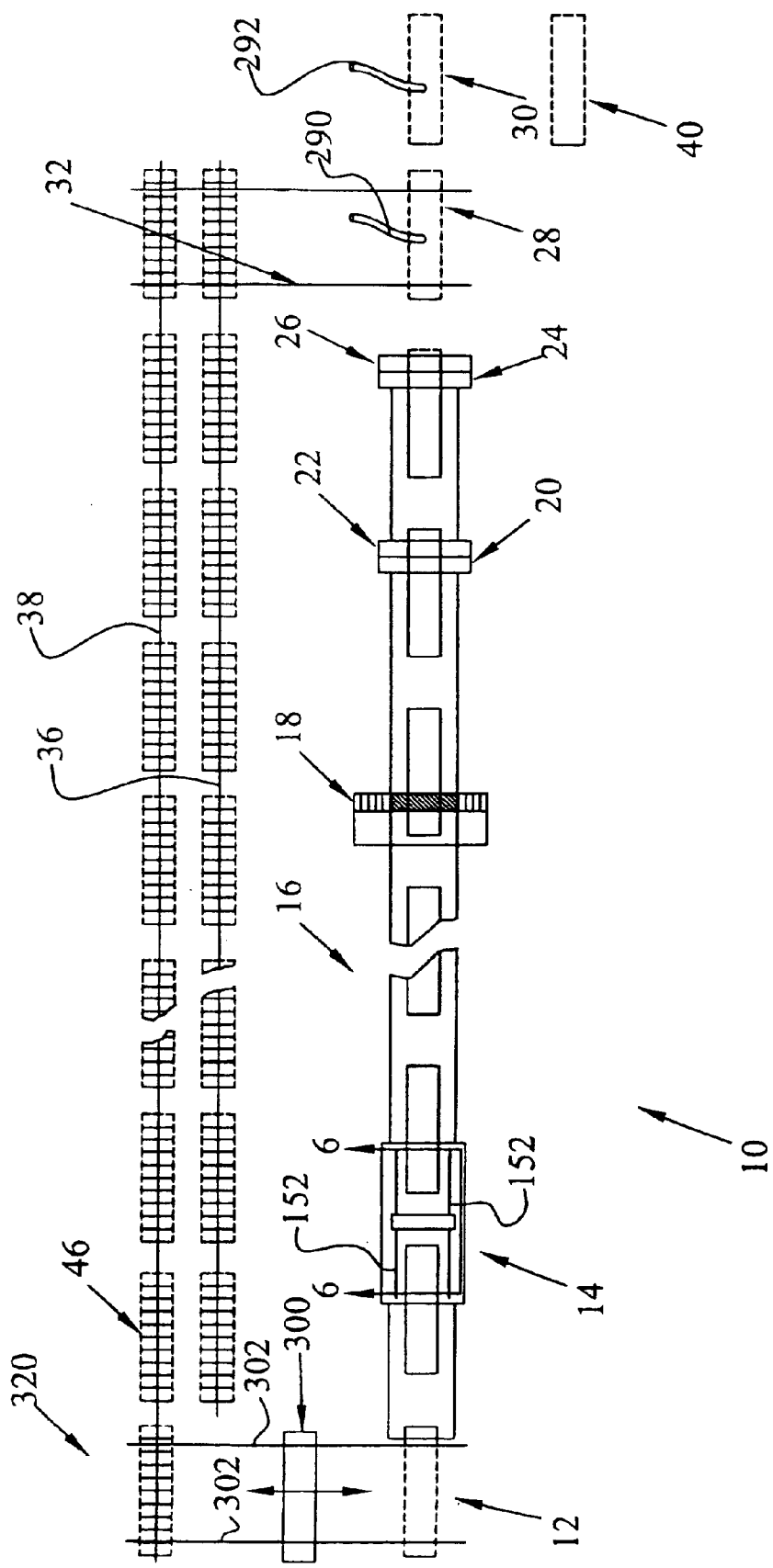
FIG. 1 shows a top plan view of the entire process according to the invention in diagrammatical form.

With reference first to FIG. 1 and FIGS. 2A–2E, the apparatus is generally shown at 10, which comprises a transfer and loading station at 12, a gel coating spray section at 14, with a curing oven 16 extending continuously therefrom. Curing oven 16 continues longitudinally and includes an operator's viewing station 18, which transversely spans the longitudinal path of the curing oven 16. The apparatus 10 further includes a first resin dispensing and fiberglass application station at 20, followed by a first operator's station 22; and a second resin dispensing and fiberglass application station 24, followed by a second operator's station at 26. The apparatus further includes vacuum mechanisms 28 and 30, as well as a transverse transfer station at 32. Transfer station 32 extends to longitudinal transfer stations 36 and 38, which return to station 12. Finally, apparatus 10 includes a control panel at 40 for controlling the apparatus as will be described herein. Although not shown herein, one skilled in the art appreciates that the second resin station 24 may be eliminated in favor of a single station if the resin is applied in a sufficient thickness at such a single station. One skilled in the art appreciates the glass reinforcements in the present invention may comprise other reinforcement materials, such as polymer, natural or other fibers, or sheets of reinforcement material.

Figure 3:
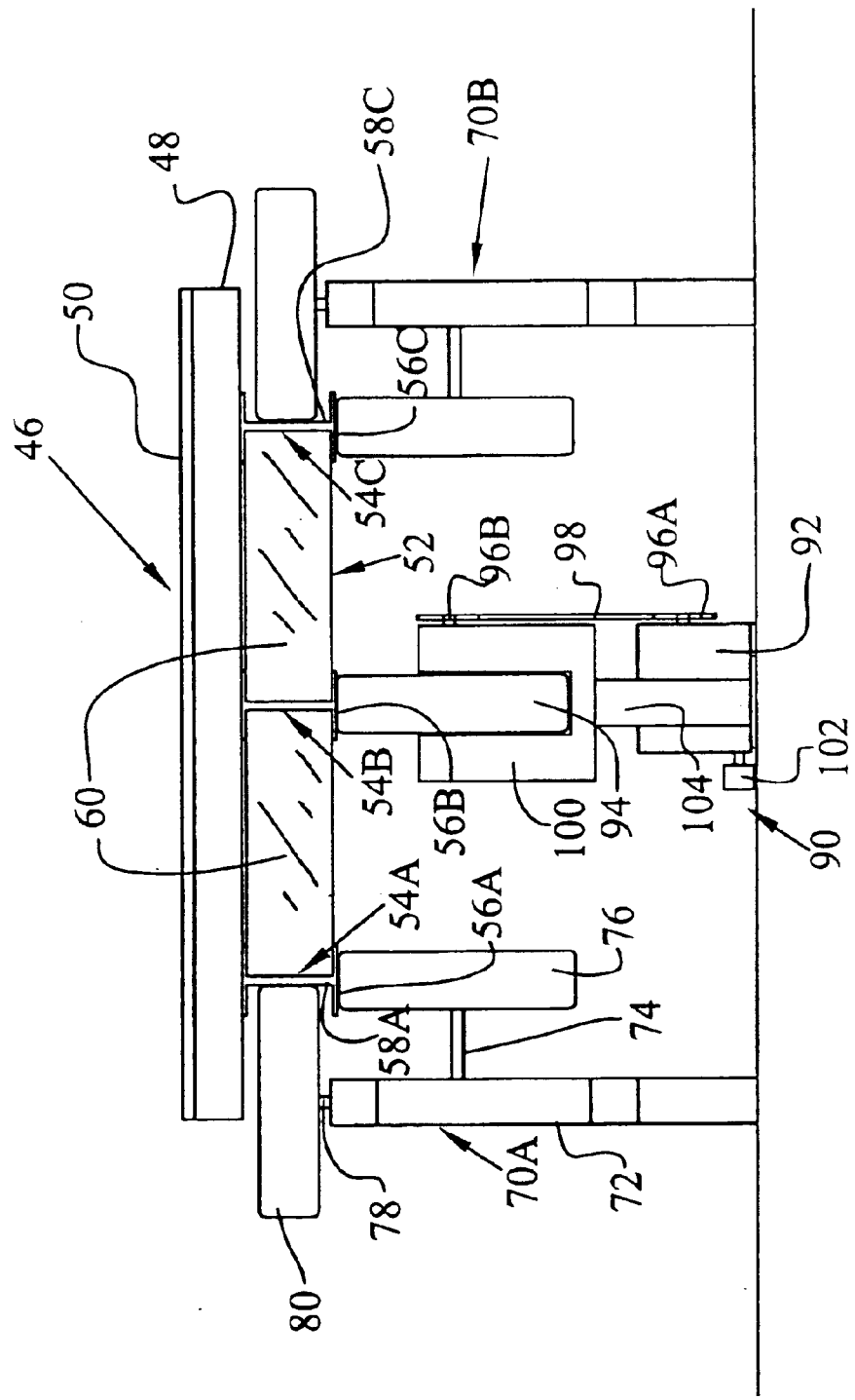
FIG. 3 shows a front plan view of the mold and guide and drive mechanism according to the present invention.
Figure 4:
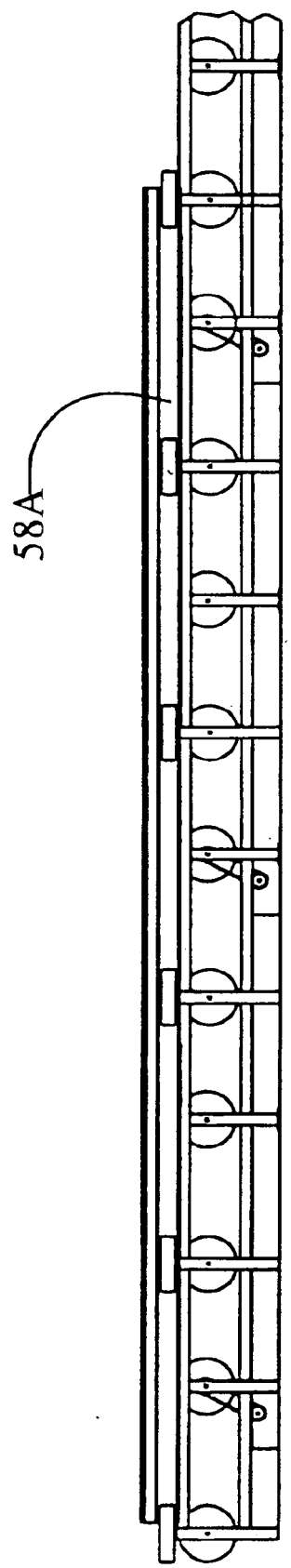
FIG. 4 is a side plan view of the apparatus shown in FIG. 3.

With reference now to FIG. 3, an elongate mold is shown at 46 including a base part 48 and an upper portion 50 having a finished and polished surface. The mold 46 further includes in a preferred embodiment a sub-frame 52 comprised of three I-beams, 54A, 54B and 54C. Each of the I-beams forms a lower support surface 56A, 56B and 56C. Furthermore, channel portions 58A and 58C are formed on the exterior sides of the I-beams as will be described herein. For structural rigidity, plates 60 are positioned intermediate the I-beams 54A and 54B, and 54B and 54C.

With reference still to FIG. 3, guide mechanisms 70A and 70B are shown as being disposed on opposite sides of mold 46. It should be appreciated that guide mechanisms 70A and 70B are preferably substantially identical, and the "A" and "B" designate location only, otherwise the guide mechanisms 70A and 70B are identical. For that purpose, only one such guide mechanism will be described in detail. As shown in FIG. 3, guide mechanism 70A includes an upstanding pedestal 72 retaining axle 74 and roller 76. Furthermore, a vertical axle 78 projects upwardly from pedestal 72 and rotationally mounts roller 80 as shown therein. It should be appreciated from FIG. 3 that the rollers 76 and 80 are profiled and positioned relative to pedestal 72 such that roller 76 provides rolling support against lower support surface 56A of I-beam 54A, whereas roller 80 provides lateral guidance within channel portion 58A of I-beam 54. As shown in FIGS. 2A–2E, a plurality of guide mechanisms 70A are positioned at various longitudinal locations so as to support the mold along its longitudinal locations. In a preferred embodiment of the invention, the roller mechanisms 70A are positioned every eight to ten feet such that, for every mold 40' long, the mold 46 is vertically supported by four to five guide mechanisms 70A on each side, or eight to ten guide mechanisms total.

With respect still to FIG. 3, a drive mechanism 90 is shown as including an AC variable speed motor 92 coupled to drive a roller 94. While various different possibilities exist for the drive train between motor 92 and roller 94, FIG. 3 depicts the drive train as a chain-and-sprocket-style drive having sprockets 96A and 96B together with chain 98. Roller 94 is supported by a yoke 100, where sprocket 96B is preferably directly coupled to roller 94. Each motor includes its own switch 102 connected to motor 92 and interconnected to panel 40 for controlling the speed of each individual motor 92 at control panel 40. It should also be appreciated from FIG. 3 that roller 94 is mounted within yoke 100 and by way of pedestal 104 such that roller 94 engages surface 56B of I-beam 54B with sufficient contact so as to longitudinally drive mold 46 upon rotation of roller 94.

Figure 2A:
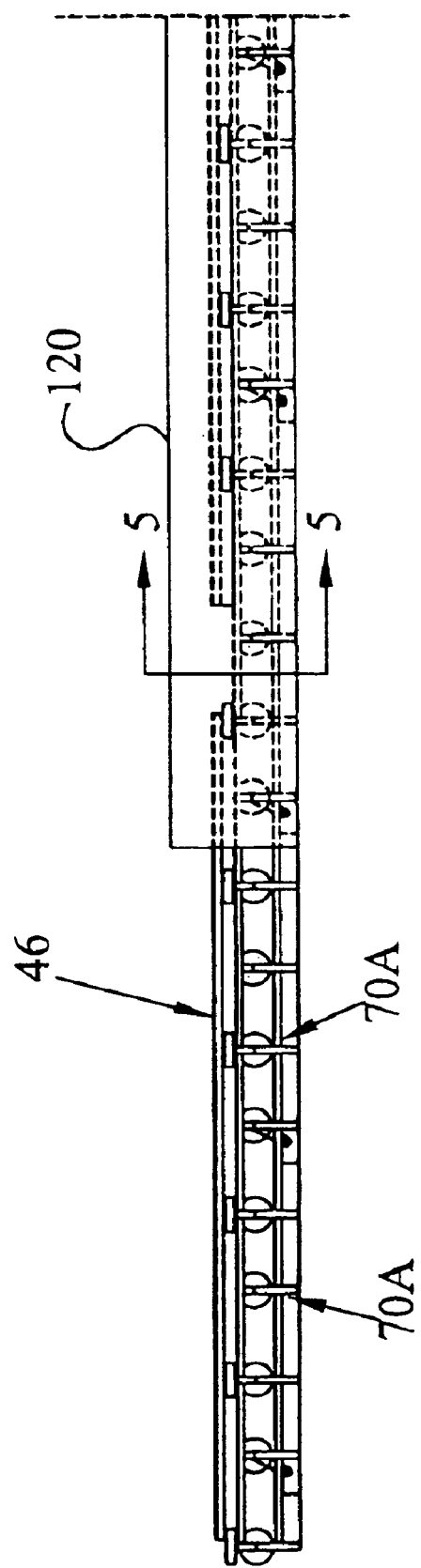
FIGS. 2A–2E show side plan views of the mechanism of FIG. 1.
Figure 2B:
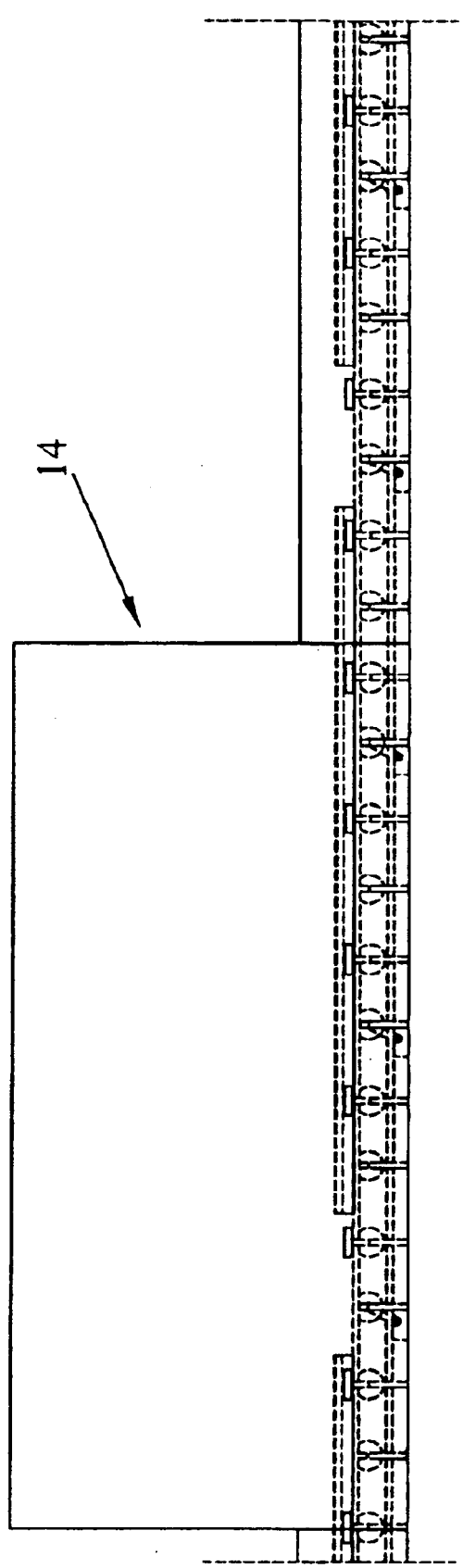
Figure 2C:
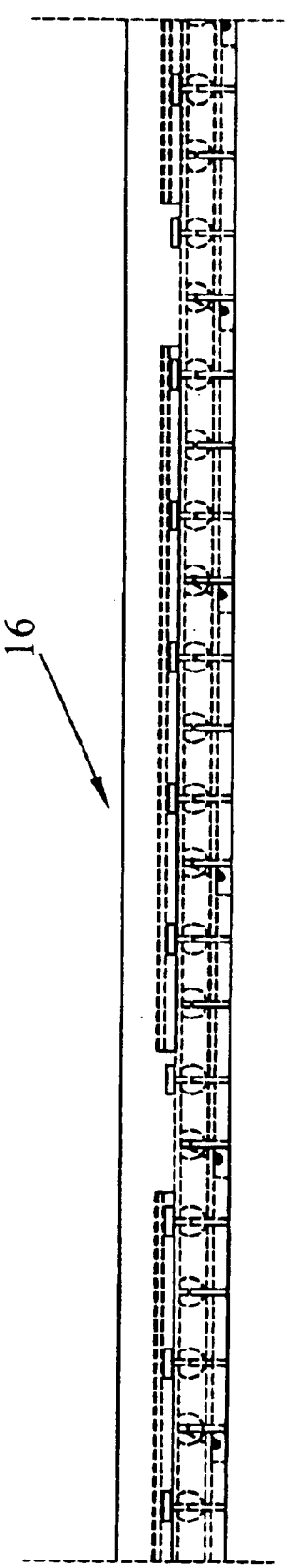
Figure 2D:
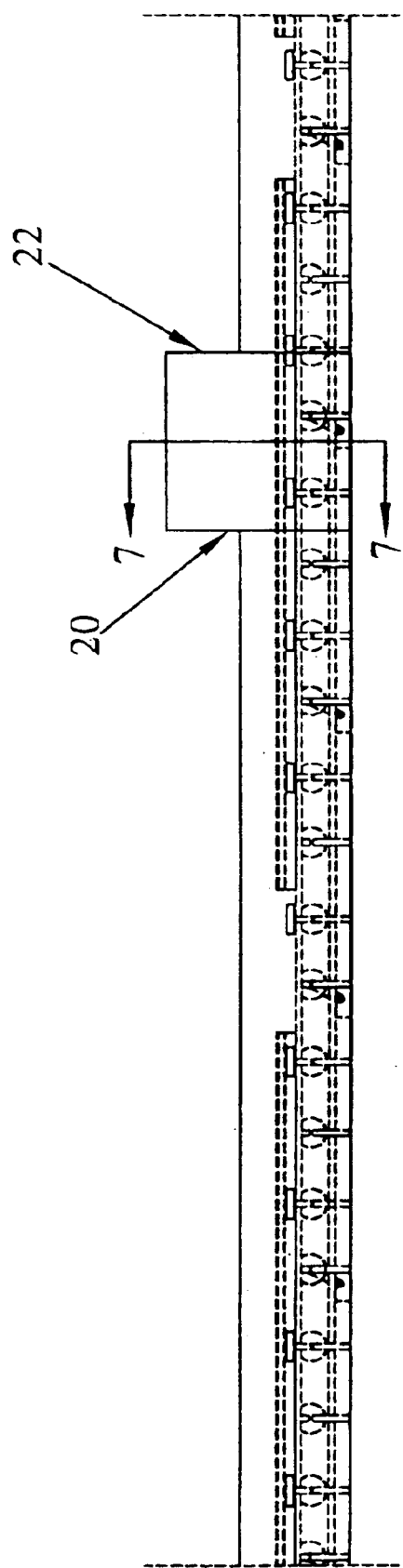
Figure 5:
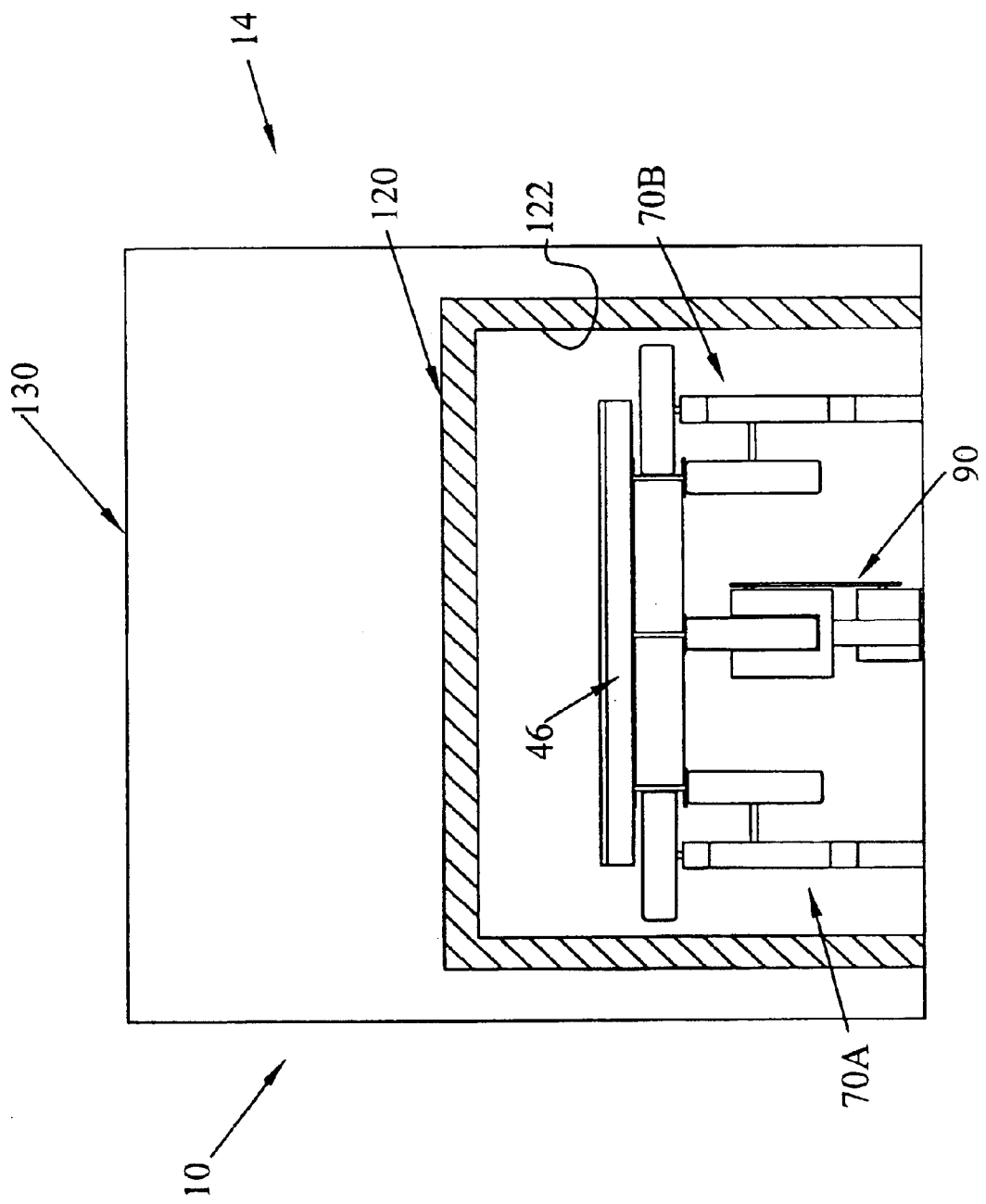
FIG. 5 is a cross-sectional view through lines 5—5 of FIG. 2A.
Figure 6:
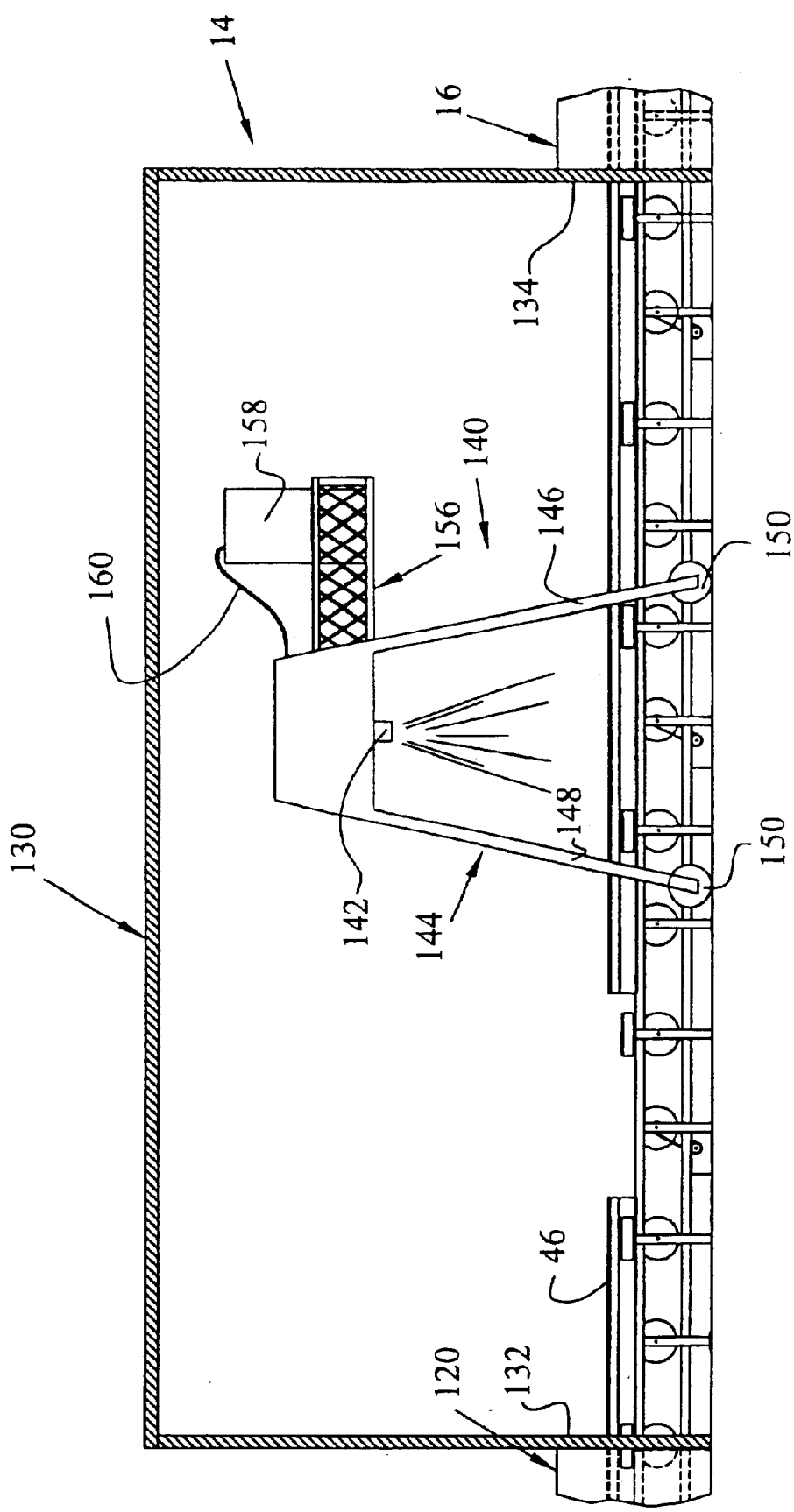
FIG. 6 is a cross-sectional view through lines 6—6 of FIG. 1.

With reference now to FIGS. 2A and 5, the apparatus 10 includes a front enclosure section 120 enclosing the various guide mechanisms 70A, 70B and drive mechanisms 90, and further includes an opening 122, which is profiled with just enough clearance to receive molds 46 thereunder. Opening 122 leads into spray station 14 as shown in FIG. 6. Spray station 14 includes an enlarged enclosure section at 130, which includes a forward opening at 132 continuous with enclosure 120 and includes a rear opening 134, leading into oven 16. Spray station 14 further includes a sprayer mechanism 140 comprised of an elevated spray head 142 supported by a movable trolley member 144. Trolley 144 includes upright supports 146, 148 having rollers 150 for receipt within longitudinal rails 152 as shown in FIG. 1. Trolley 144 includes a drive mechanism to drive trolley bi-directionally as viewed in FIG. 6 and as will be described in further detail herein. As shown still in FIG. 6, trolley 144 includes a shelf member 156 for supporting drums 158, which supply spray head 142 with spray fluid via hose 160 as will be described further herein. Such sprayer and trolley equipment may be obtained commercially from Magnum Venus Products in Kent, Wash., or may comprise a gel coat reciprocator obtained therefrom.

Figure 8:
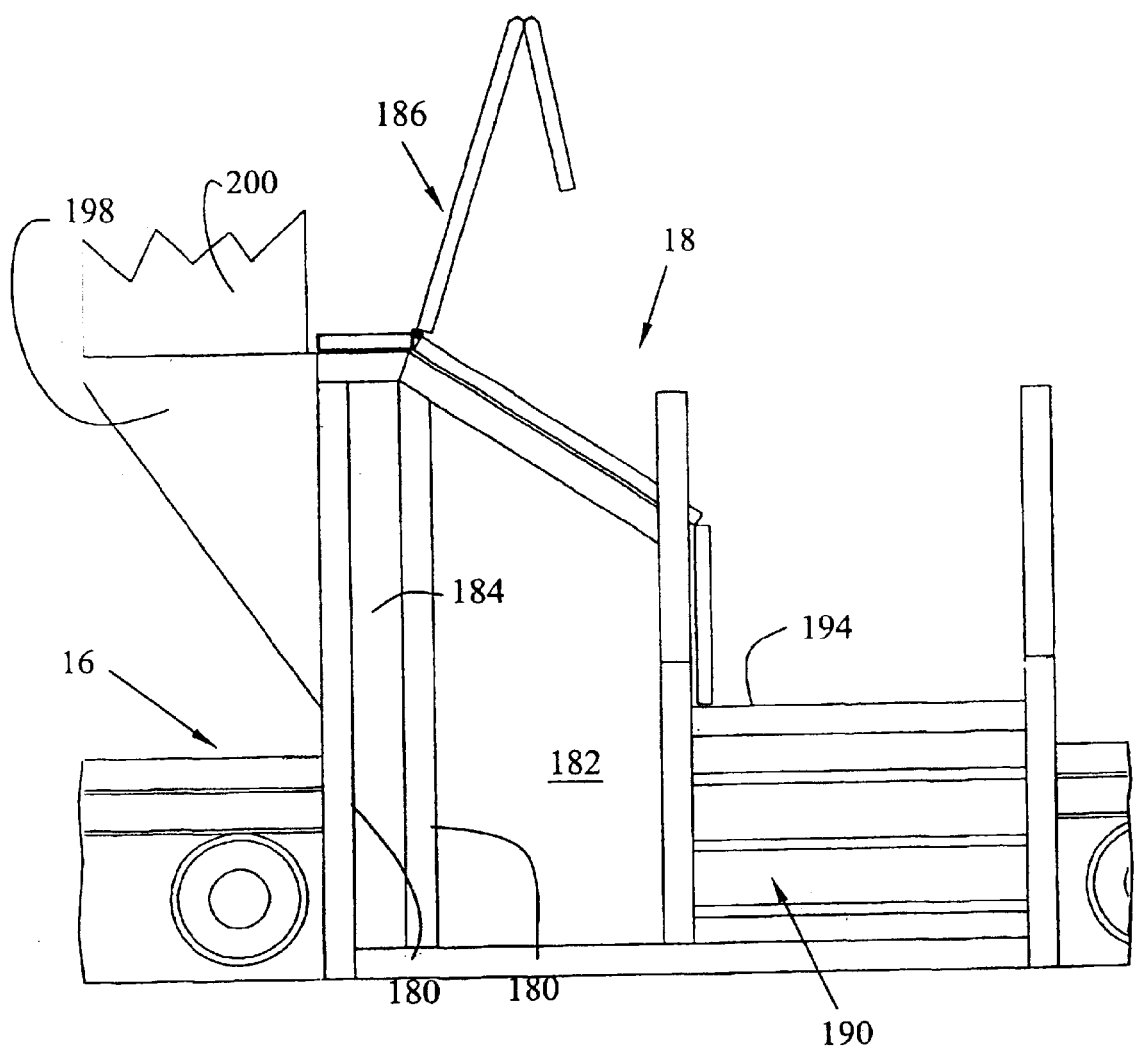
FIG. 8 is a side plan view of an operator viewing station, which spans the longitudinal drive mechanism of FIGS. 1 and 2.
Figure 9:
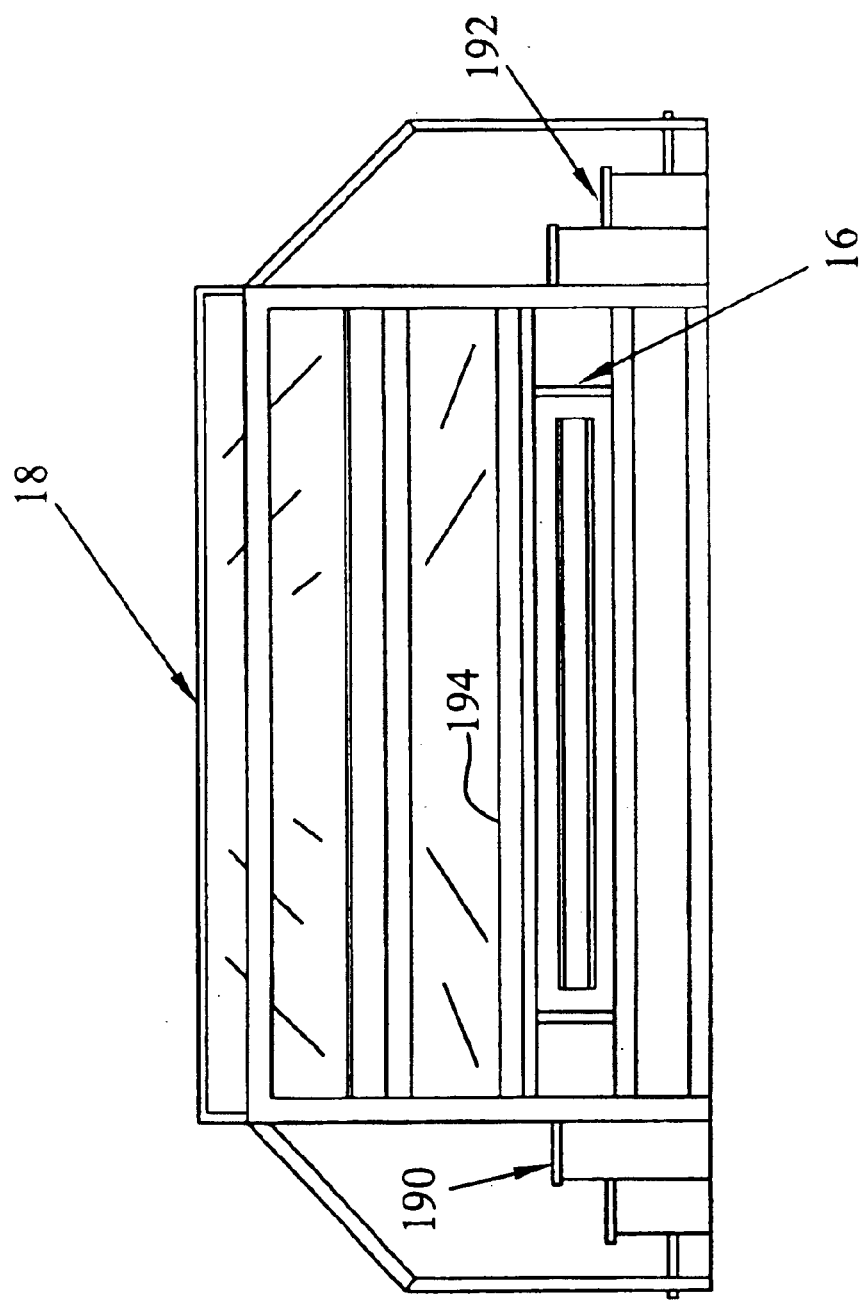
FIG. 9 is an end plan view of the viewing station of FIG. 8.
Figure 10:
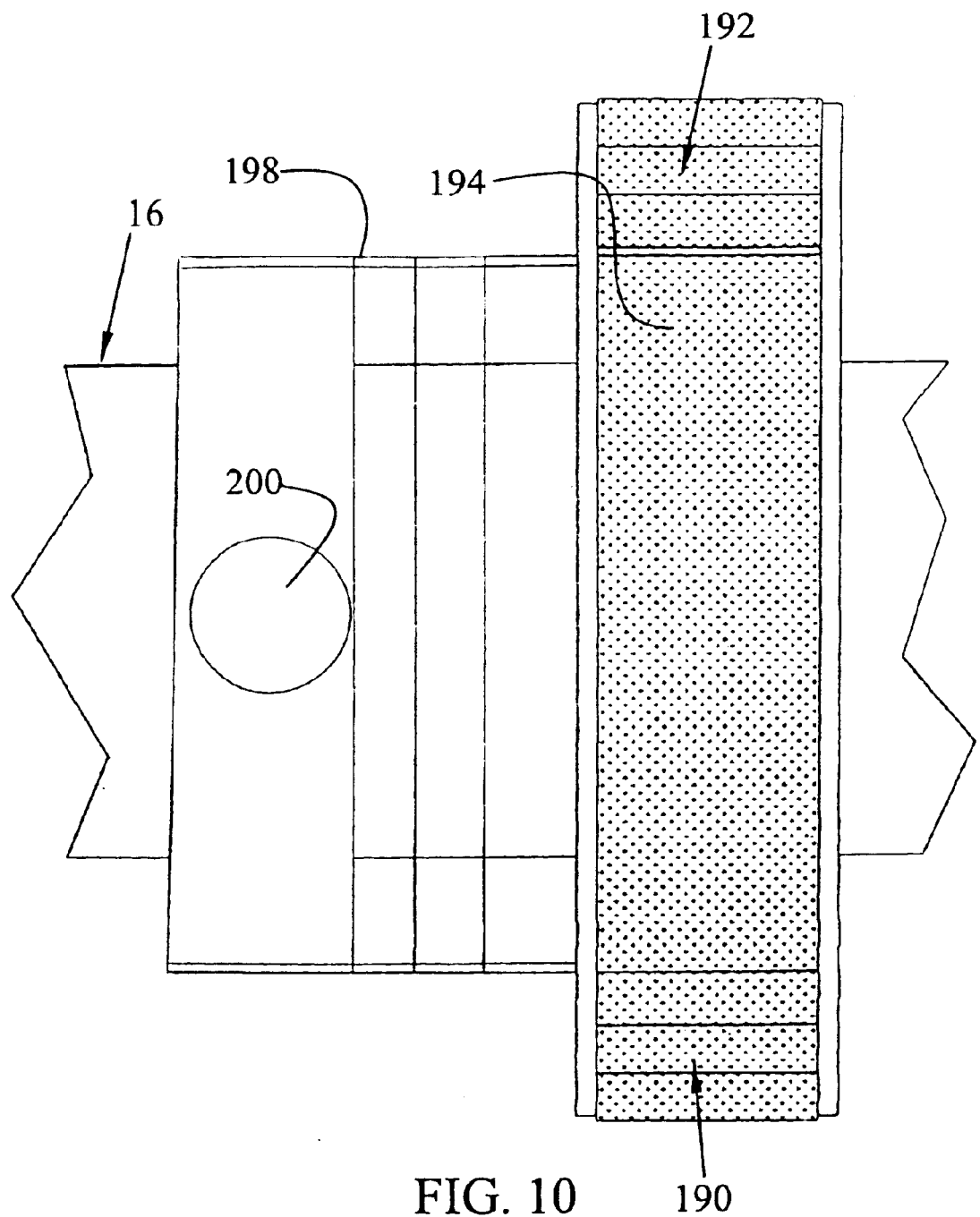
FIG. 10 is a top plan view of the viewing station of FIGS. 8 and 9.

With respect now to FIGS. 8–10, the operator's viewing station 18 includes a frame section 180 for supporting glass panels such as 182, 184. The operator's viewing station also includes a hinged glass section 186, which can be lifted to view the passing molds 46 therebeneath. A dual staircase 190, 192 leads to a gangway 194, which extends transversely over the curing oven 16 to access the viewing station from opposite sides thereof. The viewing station 18 can further include a duct section 198 with a vent stack 200 to ventilate the system at the operator's viewing station such that opening the hinged glass section 186 does not exhaust fumes into the plant environment.

Figure 2E:
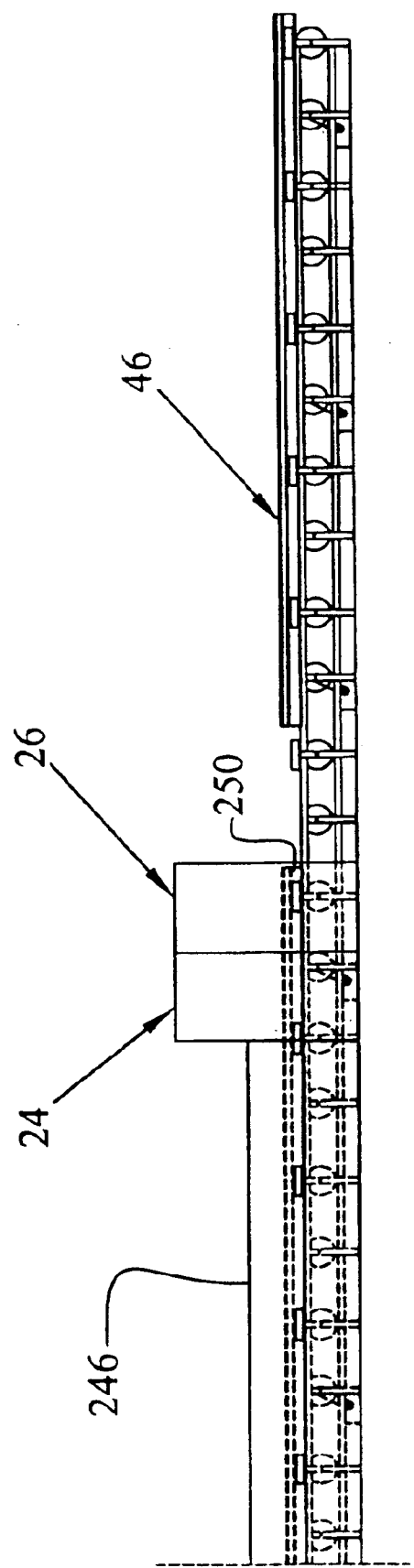
Figure 7:
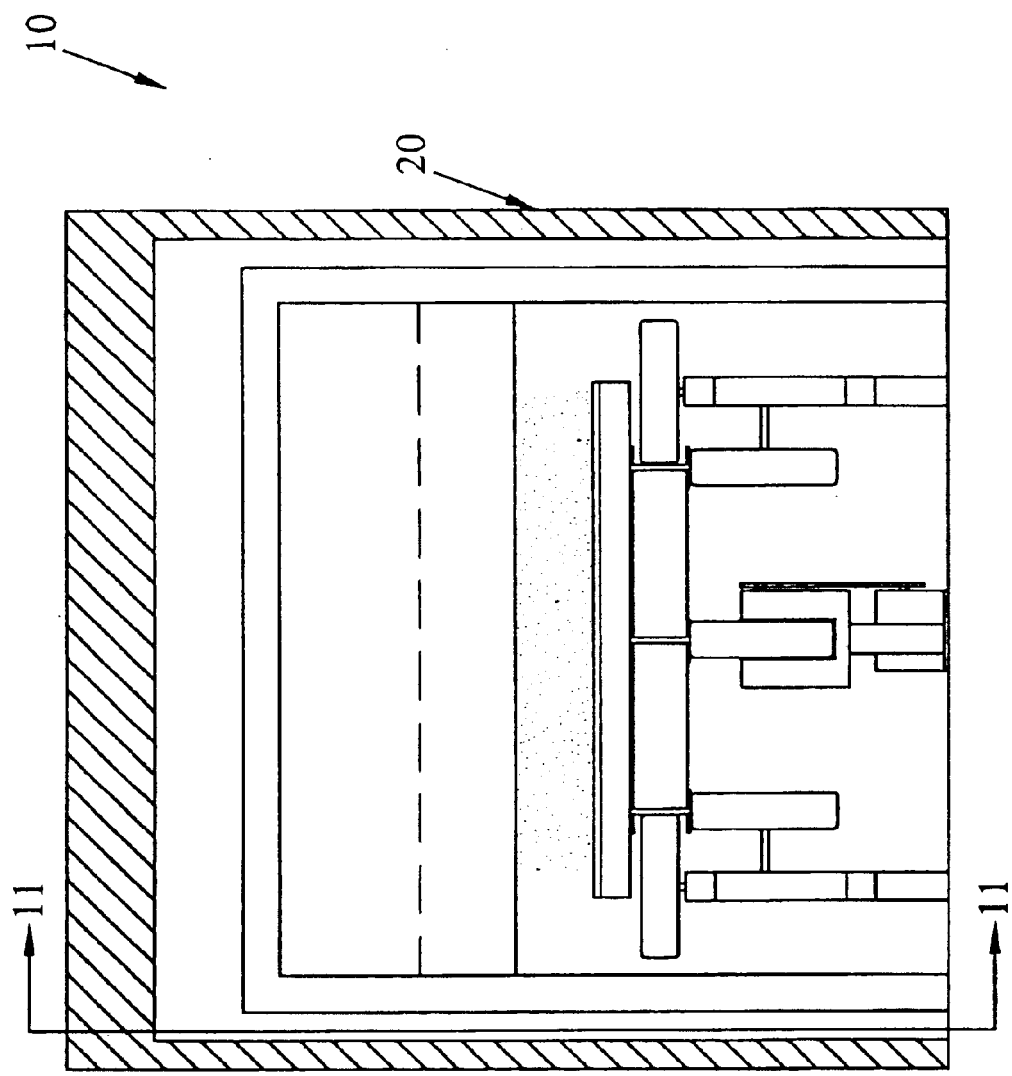
FIG. 7 is a cross-sectional view through lines 7—7 of FIG. 2D.
Figure 11:
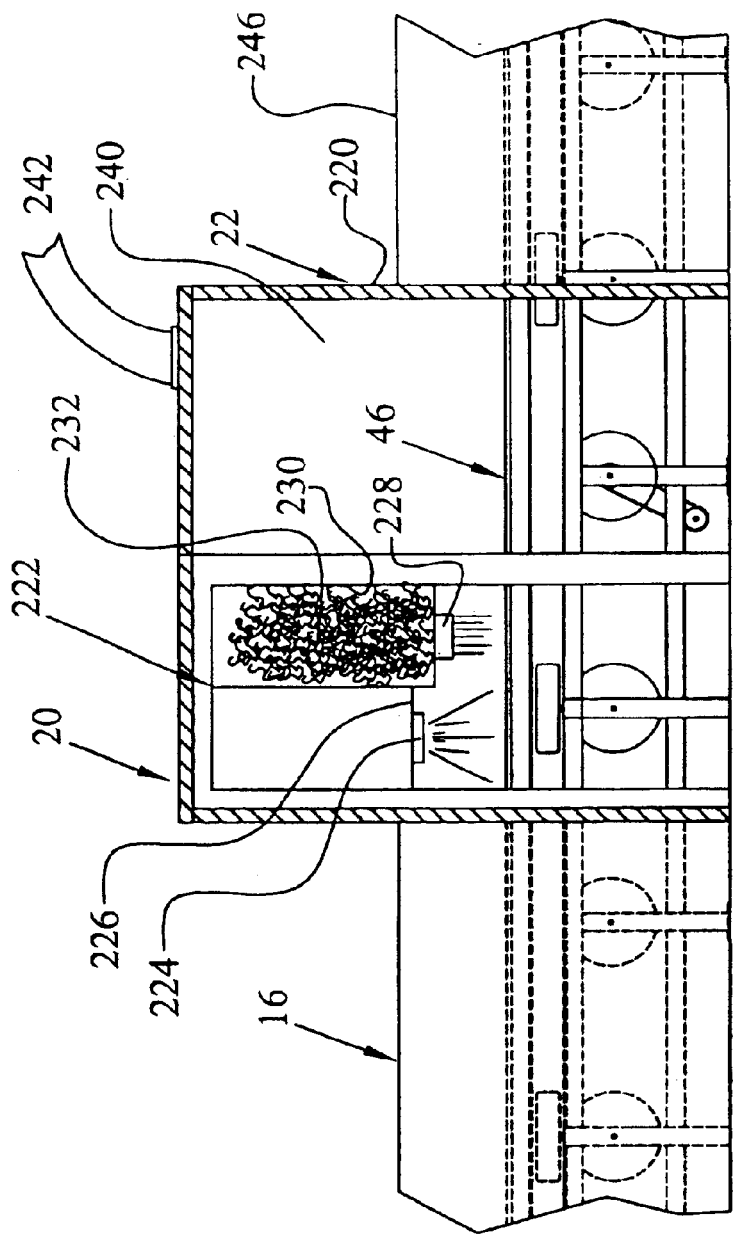
FIG. 11 is a cross-sectional view through lines 11—11 of FIG. 7.

With respect now to FIGS. 7 and 11, first resin dispensing and fiberglass application station 20 includes an outer enclosure 220 having an applicator assembly 222 positioned therein including a resin applicator 224, which sprays resin from a dispenser 226. Applicator assembly 222 further comprises a chopping station 228, which chops and dispenses fiberglass strands from a dispenser 230, which retains bulk fiberglass 232. Such Applicator assembly 222 may comprise a chopper obtained commercially from Magnum Venus Products in Kent, Wash., or preferably may comprise a reciprocator obtained therefrom. Alternatively, one could apply a glass mat in lieu of, or in addition to, the chopped fibers. Outer enclosure 220 includes an inner environment at 240 which is adequate room to receive an operator therein, where preferably an operator manually rolls the fiberglass with elongate rollers such that the fiberglass pieces become embedded within the resin, and the air is removed from the fiberglass strands. A downdraft mechanism 242 is provided to provide fresh air into the operator's station. As shown in FIGS. 2E and 11, rear enclosure section 246 is positioned intermediate first operator station 22 and the second resin dispensing and fiberglass application section 24. It should be appreciated that stations 24 and 26 are identical to stations 20 and 22, respectively, and therefore need not be described in further detail. However, with reference to FIG. 2E, after passing through station 26, molds 46 exit through an opening 250 to enter the transverse transfer section 32 including vacuum members 28, 30.

Figure 12:
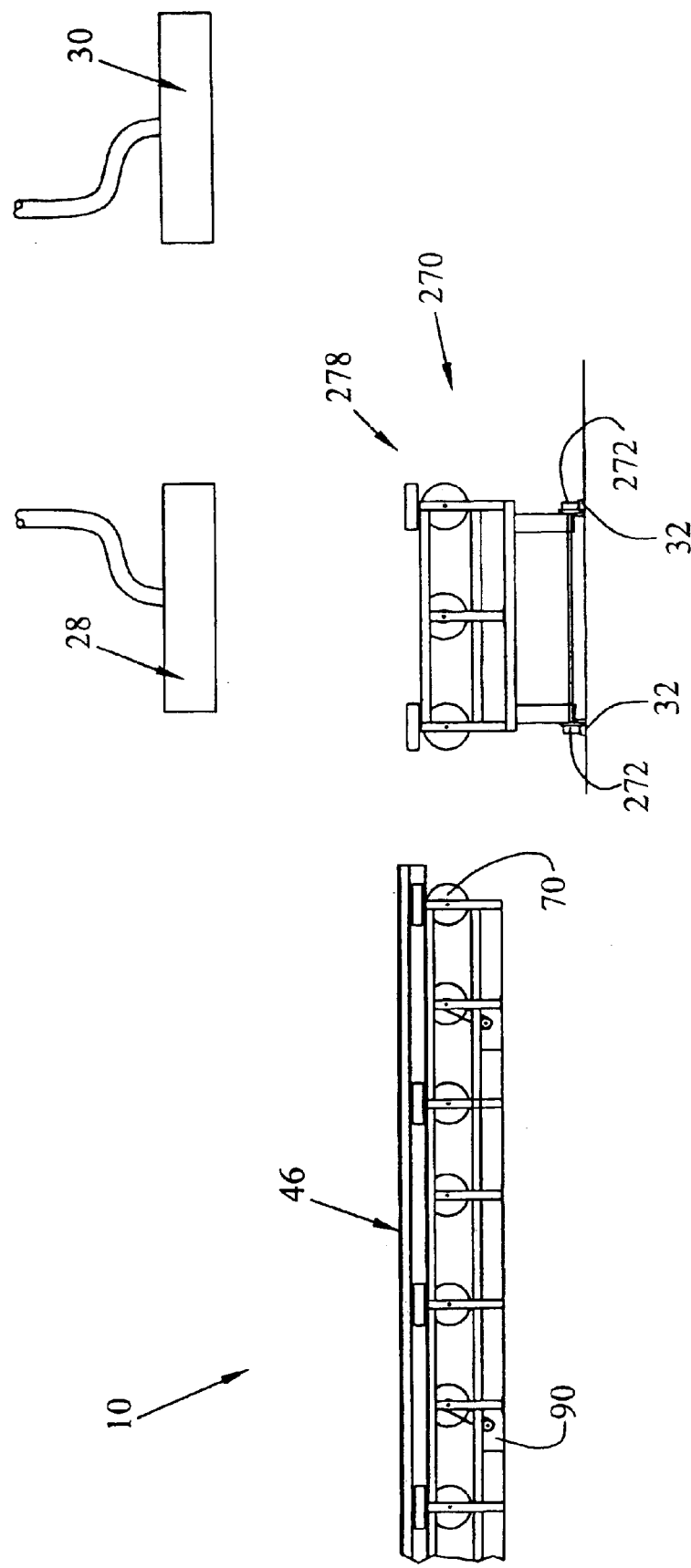
FIG. 12 depicts a side plan view of the vacuum station.
Figure 13:
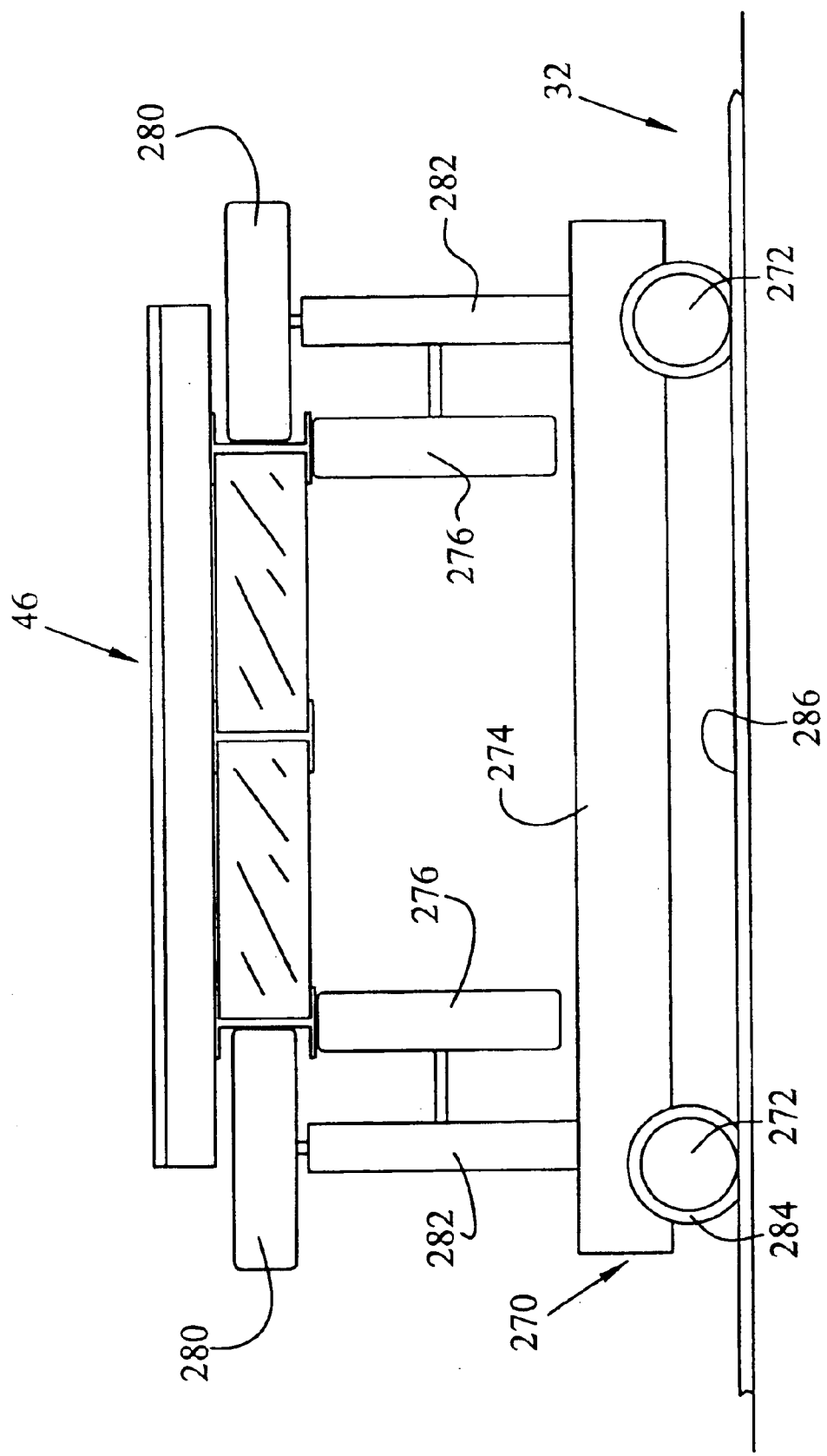
FIG. 13 depicts a side plan view of the transverse trolley shown in FIG. 12.

As shown in FIGS. 2E and 12, the guide mechanisms 70A and drive mechanisms 90 are external to the station 26. Transverse trolley 270 has rollers 272 for transverse movement along transverse transfer station 32. Transfer trolley 270 includes an upper carrier section 278, which is alignable with, and virtually identical with, the guide members 70A and 70B. As shown in FIG. 13, transverse trolley 270 includes a base section 274, which retains rollers 276 and 280 by way of pedestals 282. Rollers 272 include inside enlarged diameter sections 284, which ride on the inside surface of rails 286, which form the transverse transfer station 32. It should also be appreciated that vacuums 28, 30 have exhaust hoses 290, 292 which extend from the ceiling and are flexible enough to move along rails of transverse transfer station 32, from a position aligned with guide sections 70A, 70B to a position aligned with either of longitudinal transfer station 36 or 38. It should be appreciated that the longitudinal transfer stations 36 and 38 are virtually identical to the line which extends through the enclosure, to include guide mechanisms 70 and drive mechanisms 90. Finally, as viewed in FIG. 1, a second transverse trolley 300, substantially identical to trolley 270, is positioned in rails 302 to move between lines 36, 38 to begin the process once again.

With reference now to FIGS. 2A–2E and 3, the process will be described in sequential order. A first elongate mold 46 is aligned with the guide mechanisms 70A, 70B and the drive mechanisms 90, whereupon the drive mechanisms 90 can move the mold 46 into the front enclosure section 120. The molds 46 thereafter pass beneath spray head 142 (FIG. 6) such that a gel coating is sprayed on the top finished surface of the mold 46. To achieve the proper thickness of the gel coating on the mold 46, the movable trolley 144 can either be held idle with the drive mechanisms 90, only moving the molds relative to the movable trolley 144, or the trolley can be moved in either direction to increase or decrease the relative speed between the molds 46 and the spray head 142 (while the molds move or are held stationary).

After having passed through the spray station 14, the molds 46 enter enclosed curing oven 16, whereby the gel coating is cured. While various gel coatings require different times and temperatures to cure, it is anticipated that the oven would operate at a temperature range of approximately 100°–120°F., and move through the curing oven 16 for approximately twenty minutes. From the oven 16, the molds 46 enter stations 20, 22, whereby resin is dispensed through spray head 224 on top of the cured gel coating, and chopped fibers are thereafter dispensed through chopping station 228 on top of the resin. The molds 46 thereafter pass into the operator station 240, where the fiberglass is rolled into the resin, preferably manually by an operator. As mentioned above, a second resin spraying and fiberglass application is accomplished by stations 24, 26, whereupon the molds enter station 26 through opening 250. As mentioned above with reference to FIGS. 12 and 13, trolley 270 is now aligned with apparatus 10, such that rollers 276 are aligned with rollers 76 of guide mechanism 70, and rollers 280 are aligned with rollers 80 of guide mechanism 70. In this manner, mold 46 is simply driven right onto trolley 270 with rollers 280 cooperating with channels 58A, 58C (FIG. 3), and rollers 276 cooperate with surfaces 56A and 56C (FIG. 3) to load mold 46 onto trolley member 270.

The reinforcement sheets (typically wood, and commonly referred to as luan) are now placed over the resin and fiber composition. As the sheets are normally provided in 1.2×2.4 meter (4 ft.×8 ft.) sheets, the luan is added over the resin glass resin-fiberglass composition in a side-by-side fashion, forming 2.4 m (8 ft) seams along their side edges. The sheets may be rolled to improve the adhesion between the sheets and resin. Webbing is normally placed in strips over the seams, and a vacuum, either 28 or 30 is placed over the entire assembly and clamped to the top of the mold. Alternatively, a continuous sheet may be applied to the resin surface, or a foam may be extruded thereupon, depending upon the particular design and use of the sheet. The trolley 270 is moved transversely towards longitudinal transfer stations 36, 38, and are delivered to either station. Trolley 270 is now returned to the position shown in FIG. 12 so as to pick up the next mold 46 in line. This mold now receives the luan sheets and the alternate vacuum 30 is now placed over this mold and composition, and trolley 270 delivers this mold together with the vacuum to either of longitudinal transfer lines 36 or 38. Meanwhile, an overhead crane will pick up the first vacuum of this sequence and return it to a position similar to that shown in FIG. 1 to now be used with the next mold 46 in line. This process continues, whereby vacuums 28 and 30 are simply rotated for use as needed. The exhaust hoses 290 have ample length and flexibility so as to move between the position shown in FIG. 1 and to and from the longitudinal transfer lines 36, 38. Thereafter the molds 46 are driven to the left as viewed in FIG. 1, back towards unloading station 320, whereby finished sheets are unloaded for further processing. As shown in FIG. 1, transfer and loading station 12 includes a second trolley 300, identical to trolley 270. Therefore, the molds 46 are placed on trolley 300 and moved transversely on rollers 302 back to a starting position.

It should be appreciated then that many advantages are provided by the above-described apparatus. Firstly, it should be recognized from FIG. 1 that the process of moving the molds 46 through the apparatus is a circular pattern moving from transfer and loading station 12 through the apparatus 10 to the transverse transfer stations and then back to longitudinal transfer stations 36 and 38, returning again to transfer and loading station 12. Thus, it should be appreciated that the molds need not be picked up at any stage but rather are transferred via the respective transfer stations. It should also be appreciated that great flexibility is allowed by the individually driven elongate molds by the drive mechanisms 90. As described above, each individual motor 92 is operated by a switch 102. Thus, if a mold is completed for example at station 26, but a problem exists in spray station 14, those individual motors may be stopped completely, or possibly slowed down. Furthermore, when the error is corrected, all of the individual molds behind station 26 may be sped up to "catch up" with the elongate molds further in the process. Also, given the variety of different gel coatings used on various panels, the overall process speed may be easily controlled by increasing or decreasing the speed of all of the motors such that the time spent in a curing oven is either increased or decreased. Additionally, the line may include long stretches to act as buffers for extra molds or additional process steps. Alternatively, the rollers of the invention may be replaced by other conveyance means, such as a power and free conveyor on which the molds are carried, such as those used to convey automobile bodies within an assembly plant.

Finally, with respect to the ventilation, it is anticipated that the entire line, including the front enclosure section 120, spray station 14, curing oven 16, and finally, rear enclosure section 246, are totally enclosed, such that all active vapors, such as from the gel coating and the resins, may be ventilated through one or more ventilation stacks, such as 200.

What is claimed is:

1. An apparatus for manufacturing fiberglass-reinforced panels, comprising:
   a plurality of molds for receiving the components of the panels;
   a spraying apparatus for applying an exterior coat for said panels;
   an applicator mechanism for applying resin and fiberglass to said panels;
   a guide mechanism for guiding the molds through said spraying apparatus and applicator mechanism; and
   a drive mechanism for independently driving individual ones of said plurality of molds.

2. The apparatus of claim 1, wherein drive mechanism is comprised of a plurality of drive rollers.

3. The apparatus of claim 2, wherein said molds each comprise an elongate support surface, having an upper finished surface, and a lower sub-frame, said lower sub-frame including a horizontally projecting, longitudinally extending drive surface, whereby said drive rollers engage said drive surface.

4. The apparatus of claim 3, wherein said lower sub-frame includes at least one longitudinally extending I-beam, and said lower drive surface is provided by a lower surface thereof.

5. The apparatus of claim 4, wherein said drive rollers are motor driven.

6. The apparatus of claim 5, wherein said drive rollers are driven by variable speed motors.

7. The apparatus of claim 6, wherein each said variable speed motor is individually controllable.

8. The apparatus of claim 1, wherein said guide mechanism is comprised of a plurality of guide rollers.

9. The apparatus of claim 8, wherein said guide rollers comprise a first plurality of rollers, each having a rotational axis along a horizontal axis, to guide said molds in a horizontal sense.

10. The apparatus of claim 9, wherein said molds each comprise an elongate support surface, having an upper finished surface, and a lower sub-frame, said lower sub-frame including horizontally projecting, longitudinally extending first reference surfaces, whereby said first plurality of rollers engage said first reference surfaces.

11. The apparatus of claim 10, wherein said guide rollers further comprise a second plurality of rollers, each having a rotational axis along a vertical axis, to guide said molds in a lateral sense.

12. The apparatus of claim 11, wherein said molds further comprise vertically projecting, longitudinally extending second reference surfaces, whereby said second plurality of rollers engage said second reference surfaces.

13. The apparatus of claim 12, wherein said lower sub-frame comprises I-beam members extending longitudinally below said elongate support surface and adjacent to lateral side edges thereof, said first reference surface being defined by a lower section of said I-beam, and said second reference surfaces being defined by exterior channels formed by said I-beams.

14. The apparatus of claim 13, wherein said lower sub-frame further includes a longitudinally extending central I-beam, and a lower surface of said central I-beam provides a drive surface.

15. The apparatus of claim 14, wherein said drive mechanism is comprised of drive rollers positioned beneath said central I-beam, drivingly engaging said drive surface.

16. The apparatus of claim 1, wherein said spraying apparatus flanks said guide mechanism, whereby said molds are driven relative to, and through, said spraying apparatus.

17. The apparatus of claim 16, further comprising an enclosure surrounding said spraying apparatus.

18. The apparatus of claim 17, wherein said enclosure further includes a ventilation system to vent fumes within said enclosure.

19. The apparatus of claim 17, further comprising longitudinally extending oven, extending from said enclosure, whereby said molds, after passing through said spraying apparatus, are driven through said oven.

20. An apparatus for manufacturing fiberglass-reinforced panel, comprising:
    a plurality of molds for receiving the components of the panels;
    a spraying apparatus for applying an exterior coat for said panels;
    an applicator mechanism for applying resin and fiberglass to said panels;
    a guide mechanism for guiding the molds through said spraying apparatus and applicator mechanism; and
    an enclosure surrounding said spraying apparatus and applicator mechanism.

21. The apparatus of claim 20, wherein said enclosure further includes a ventilation system to vent fumes within said enclosure.

22. The apparatus of claim 21, wherein said enclosure is defined as a curing oven intermediate said spraying apparatus and applicator mechanism.

23. The apparatus of claim 20, further comprising an operator viewing station, for viewing moving molds within said enclosure, from a position exterior of said enclosure.

24. The apparatus of claim 20, further comprising an operator enclosed area, downstream of said applicator mechanism.

25. The apparatus of claim 24, wherein said operator enclosed area is down-drafted to improve the air quality within the operator enclosed area.

26. The apparatus of claim 20, further comprising drive mechanism comprised of a plurality of drive rollers, to drive individual molds through said enclosure.

27. The apparatus of claim 26, wherein said molds each comprise an elongate support surface, having an upper finished surface, and a lower sub-frame, said lower sub-frame including a horizontally projecting, longitudinally extending drive surface, whereby said drive rollers engage said drive surface.

28. The apparatus of claim 27, wherein said lower sub frame includes at least one longitudinally extending I-beam, and said lower surface is provided by a lower surface thereof.

29. The apparatus of claim 26, wherein said drive rollers are motor driven.

30. The apparatus of claim 29, wherein said drive rollers are driven by variable speed motors.

31. The apparatus of claim 30, wherein each said variable speed motor is individually controllable.

32. The apparatus of claim 20, wherein said guide mechanism is comprised of a plurality of guide rollers.

33. The apparatus of claim 32, wherein said guide rollers comprise a first plurality of rollers, each having a rotational axis along a horizontal axis, to guide said molds in a horizontal sense.

34. The apparatus of claim 33, wherein said guide rollers further comprise a second plurality of rollers, each having a rotational axis along a vertical axis, to guide said molds in a lateral sense.

35. The apparatus of claim 34, wherein said molds each comprise an elongate support surface, having an upper finished surface, and a lower sub-frame comprised of an I-beam structure, comprising I-beam members extending longitudinally below said elongate support surface and adjacent to lateral side edges thereof, whereby said first plurality of rollers are profiled to contact a lower section of said I-beam, and said second plurality of rollers flank said I-beams, with rollers positioned within and engaging, exterior channels formed by said I-beams.

36. The apparatus of claim 35, wherein said lower sub-frame further includes a longitudinally extending central I-beam, and a lower surface of said central I-beam provides a drive surface.

37. The apparatus of claim 36, further comprising a drive mechanism comprised of drive rollers positioned beneath said central I-beam, drivingly engaging said drive surface.

* * * * *